A. C. HOUGLAND.
MILKING MACHINE.
APPLICATION FILED APR. 18, 1918.

1,347,162. Patented July 20, 1920.

Inventor:
Albert C. Hougland,
by: T. C. Bradbury.
Attorney.

UNITED STATES PATENT OFFICE.

ALBERT C. HOUGLAND, OF ST. PAUL, MINNESOTA.

MILKING-MACHINE.

1,347,162.

Specification of Letters Patent.

Patented July 20, 1920.

Application filed April 18, 1918. Serial No. 229,374.

*To all whom it may concern:*

Be it known that I, ALBERT C. HOUGLAND, a citizen of the United States, residing at St. Paul, county of Ramsey, and State of Minnesota, have invented a new and useful Improvement in Milking-Machines, of which the following is a specification.

The object of my invention is to provide a milking machine, which will operate by the use of a single pipe line in which air is exhausted to actuate the milking machine. A further object is to provide means by which the valves of the milking machine can be operated automatically and adjusted to the desired speed. A further object is to provide a milking machine having a pulsator which can be used with one or a plurality of milk receiving tubes. A further object is to provide a milking machine, which can be operated either at close or long range from the source of air exhaust, and by which the machine can be transferred from one milk receptacle to another without in any way affecting efficiency in operation. Among further objects are the production of a milking machine, which is positive in its action and simple in construction, and which will not easily get out of order, and the parts of which can be easily examined an dadjusted.

To these ends my invention comprises the features of construction and combination of parts as are hereinafter described and particularly pointed out in the claims.

Figure 1:
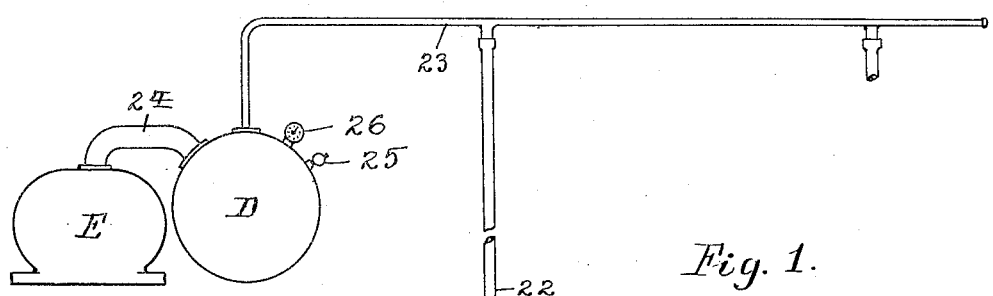
Figure 2:
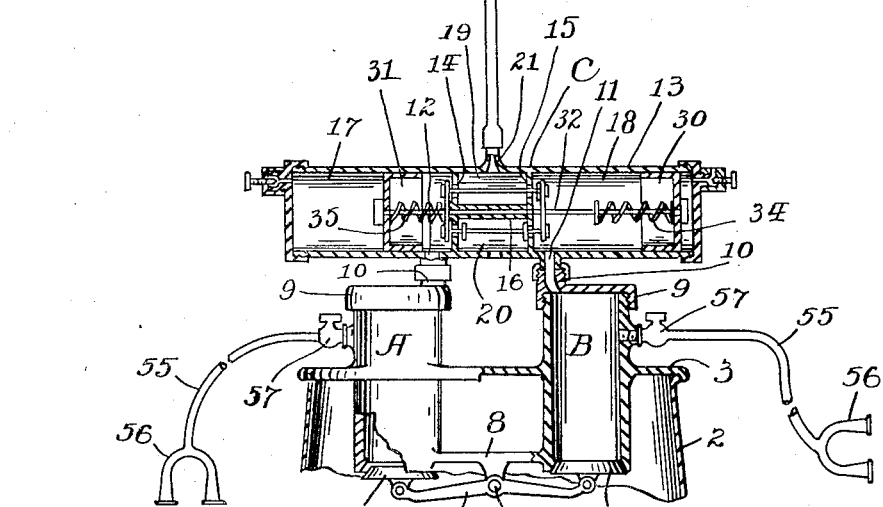
Figure 3:
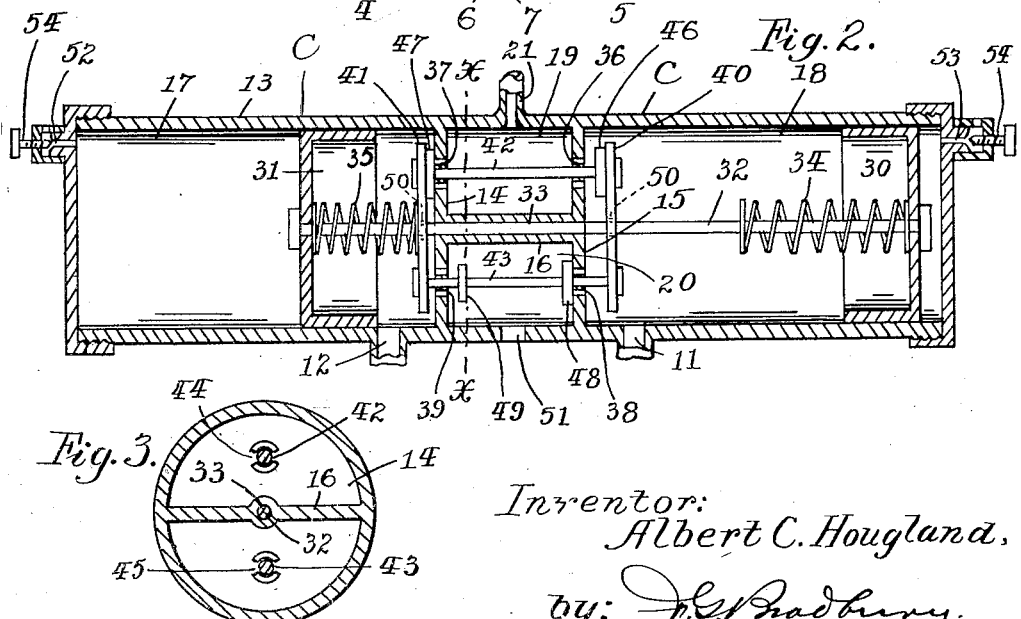

In the accompanying drawing forming part of this specification, Figure 1 is a view partly in section of a milking machine, embodying my invention, part of one of the milk receptacles being illustrated; Fig. 2 is a longitudinal section on an enlarged scale of the valve mechanism forming what I have chosen to term the "pulsator," and Fig. 3 is a cross section taken on the line X—X of Fig. 2.

In the drawing 2 indicates a suitable milk receptacle having the usual open top, it being understood that as many of these receptacles may be employed with my invention as desired. 3 indicates a cover plate fitting over the top of the receptacle and closing the same, being supported upon the receptacle wall. In this plate are constructed as many milk receivers such as A and B as desired, these receivers as shown in the drawing being in duplicate form and preferably cylindrical and projecting above and below said plate. At the lower ends of these milk receivers are a pair of poppet valves 4 and 5, which are pivotally mounted upon the opposite ends of a walking beam 6, said beam being pivoted at 7 midway between its ends on a bridge 8 extending between the walls of the milk receivers. These poppet valves are so arranged that when air is exhausted from the receptacle A the valve 4 automatically closes upon its seat and shuts the lower end of the receptacle, thus opening the valve 5 and vice versa, when air is exhausted from the receiver B, the valve 5 is closed and the valve 4 opened. The upper end of each receiver is closed by a cap 9, each of said caps being provided with a nipple 10 to which are connected the ducts 11 and 12 leading from the pulsator C, the function of which is to automatically exhaust air intermittently from the receivers A and B.

The pulsator C has a cylindrical outer shell 13 divided by a pair of spaced transverse walls 14 and 15 and a longitudinal central wall 16 into the main exhaust compartments 17 and 18 and the intermediate compartments 19 and 20. The compartment 19 is connected by the nipple 21, flexible branch pipe 22 and main line pipe 23 with an equalizing exhaust tank D from which air is exhausted by a vacuum pump E or other suitable means which is connected thereto by the pipe 24. A regulating or release valve 25 connected with the equalizing exhaust tank D is adapted to control the desired amount of vacuum in the tank and a vacuum gage 26 also connected with said tank is adapted to indicate the number of pounds air pressure in the vacuum chamber in the tank. Thus a single vacuum duct is connected with each pulsator in the pipe line. Arranged in the cylindrical shell 13 of the pulsator are a pair of pistons 30 and 31, which are mounted upon a single stem 32, said stem being adapted to slide freely through a passage 33 traversing the wall 16 longitudinally, so that the sliding movement of said pistons is always simultaneous. Projecting inwardly between the pistons 30 and 31 and secured thereto freely over the stem 32 are a pair of helical springs 34 and 35, the function of which will be hereinafter stated. The transverse walls 14 and 15 of the pulsator are provided with a pair of co-axially arranged ducts 36 and 37 forming a communication between the primary exhaust chamber 19 and the main exhaust chambers 17 and 18.

These same walls are also formed with a pair of co-axially arranged ports 38 and 39 forming a communication between the air pressure relief chamber 20 and the main exhaust chambers 17 and 18. Spaced outwardly apart from the outer sides of the transverse walls 14 and 15 are a pair of cross arms 40 and 41 which are mounted rigidly upon a pair of longitudinally disposed shafts 42 and 43, the shaft 42 being slidably mounted in the bearings 44 across the openings 36 and 37 and the rod 43 being slidably mounted upon the bearings 45 across the openings 38 and 39. Thus the structure formed by the cross members 40 and 41 and shafts 42 and 43 on which said cross members are rigidly mounted is adapted to slide back and forth freely. Carried by the cross members 40 and 41 and the shaft 42 are a pair of valves 46 and 47, which are adapted to close and open first one and then the other of the port passages 36 and 37. Arranged on the shaft 43 are a pair of valves 48 and 49, which are adapted to alternately close and open first one and then the other of the port passages 38 and 39 as the shaft 43 reciprocates. The valves 48 and 49 are arranged between the inner surfaces of the walls 14 and 15 and are thus positioned on opposite sides of said walls from those on which the valves 46 and 47 are positioned. In this manner as the valve carrying mechanism formed by the shafts 42 and 43 and cross members 40 and 41 reciprocates and when the duct 36 is closed, the duct 38 is opened and when the duct 37 is closed, the duct 39 is opened and vice versa. Suitable passages 50 are provided in the cross members 40 and 41 through which the piston rod 32 is free to slide without in any way affecting the reciprocation of said cross members. The pressure relief chamber 20 is provided with an ingress port 51 for outside air, and the main exhaust chambers 17 and 18 are provided with ingress ducts 52 and 53 for outside air which can be regulated by regulating valves 54 turned by hand. The ingress ports 11 and 12 are situated closely adjoining the transverse walls 15 and 14 and are respectively connected to said chambers 18 and 17.

Each of the milk receivers may be provided with as many valve controlled milk tubes 55 as desired, each of said tubes being provided with the usual teat cups 56 on their outer flexible ends.

Operation.

In the operation of this machine a constant partial vacuum is created in the equalizing chamber in the tank D and the force of said vacuum is transmitted to each of the pulsators such as C employed on the main line duct 23. The operation of the pulsator is entirely automatic, that is first air is successively exhausted from one and then the other of the milk receivers A and B and the milk tubes and cups connected therewith. The milk flowing into either of the milk receivers from the milk tubes will settle by gravity to the bottom and when the vacuum is detroyed will assist in opening the valve in the bottom of that milk chamber and closing the valve in the other chamber. The operation of the other milk chamber will reverse this movement. While chamber B is closed by valve 5, valves 47 and 48 are drawn tightly closed by the air exhaust action created in chambers 19 and 20 causing air to be drawn up through duct 11, and from chamber 18, thus pulling piston 30 inwardly until spring 34 presses against cross member 40 and finally urges the valves 46 and 59 closed. Previous to this action the exhaust pressure has been relieved from chamber 17 by air entering through ports 51 and 39 and the port 37 remains closed. When the valve 46 closes and the valve 48 opens the valves 47 and 49 are respectively opened and closed and the same operation repeated with respect to chamber 17 and the air exhausted from milk receiver A. Thus a pulsating action is produced which is entirely automatic. These pulsations are controlled in length of time by regulating the valves 54 to adjust the admission of air into the outer ends of the chambers 17 and 18 on the outer ends of the pistons 31 and 30.

When desired either one of the milk receivers A and B may be rendered inoperative by closing one or the other of the valves 57 in the milk tubes 55 without altering the operation of the milk tubes connected with the other of said milk receivers.

In accordance with the patent statutes I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:—

1. A milking machine, comprising, in combination, milk receivers having milk receiving tubes communicating therewith and also having milk discharge passages, check valves movably mounted and adapted to alternately close said passages when air is exhausted from said receivers, an air exhaust pipe, means for exhausting air from said pipe and a pulsator interposed between said pipe and said milk receivers adapted to alternately allow air to be exhausted from and admit air into said receivers automatically.

2. A milking machine comprising in combination, a pair of milk receivers having means for mounting them on a milk receptacle and having milk receiving tubes connected therewith and milk discharge passages, a pair of valves movably mounted and adapted to alternately close said passages when air is alternately exhausted from said receivers, a double air pulsator connected with said receivers, a single air exhaust duct connected with said pulsator and a constant source of air exhaust connected with said duct and remotely distanced from said pulsator, said pulsator being adapted to communicate suction alternately with said receivers.

3. A milking machine, comprising, in combination, milk receivers having milk receiving tubes and milk discharge passages, check valves movably mounted and adapted to alternately close said passages when air is exhausted from said receivers, an air exhaust pipe, means for exhausting air from said pipe, a pulsator interposed between said pipe and said milk receivers adapted to alternately allow air to be exhausted from and to admit air into said receivers automatically and means for regulating the length of the pulsations of said pulsator.

In testimony whereof, I have signed my name to this specification.

ALBERT C. HOUGLAND.